Feb. 6, 1962  R. C. KELLEY  3,020,457
REMOTE CONTROL SERVOSYSTEM
Filed Oct. 11, 1951  6 Sheets-Sheet 1

*INVENTOR.*
ROBERT C. KELLEY

BY

ATTORNEY

Feb. 6, 1962 R. C. KELLEY 3,020,457
REMOTE CONTROL SERVOSYSTEM
Filed Oct. 11, 1951 6 Sheets-Sheet 6

RECEIVER & SERVO
FIG. 9

CONTROLLER & TRANSMITTER
FIG. 8

*INVENTOR.*
ROBERT C. KELLEY
BY *Wm Walter Owen*
ATTORNEY

3,020,457
REMOTE CONTROL SERVOSYSTEM
Robert C. Kelley, Hollywood, Calif.
Filed Oct. 11, 1951, Ser. No. 250,923
14 Claims. (Cl. 318—16)

The present invention relates to remote control systems, and more particularly to such systems which employ a multiplicity of signal codes to control a plurality of functions at remote stations either simultaneously or selectively.

One embodiment of the invention is illustrated as controlling the operation of aircraft from any remote position, but it is to be understood that the invention is not limited to the control of aircraft. The present invention can be readily adapted to the control of many other devices. Examples, but by no means complete, are such devices as watercraft, land vehicles, industrial machinery, dams, bridges, railroad switching equipment, and traffic signal equipment.

It is an object of the present invention to provide apparatus that will result in a high speed selection of the proper signal code.

Another object is to provide apparatus that will rapidly translate the signal code into control of the selected device.

Another object is to provide apparatus that may be operated in exactly the same manner as the conventional controls in an airplane cockpit.

A further object is to provide apparatus that will permit rate control, wherein the operated control at the remote position will have the same rate of movement with respect to the operating control.

A further object is to provide apparatus that will need a minimum of radio frequency carrier waves or electrical conductors for complete operation.

Another object is to provide apparatus having a neutralizing circuit such that the operated controls at the remote position will have the same position relative to the operating controls.

Another object is to provide apparatus having a trim adjustment such that the operated controls at the remote position can be accurately set at some off-normal position by the operating controls.

One feature of the present invention is its accurate and positive operation.

Another feature is that the operating controls need not be operated in any particular sequence.

A further feature is the allowable simultaneous operation of more than one operating control, and the resultant effectively simultaneous operation of the operated controls at the remote position.

A further feature is the position for position feature made possible by the rate control apparatus, whereby the extent of operation of one operating control accurately indicates the extent of operation of the corresponding operated control at the remote position.

A further feature is the light weight and compactness of the apparatus.

The invention, both as to its apparatus and method of operation, together with further objects and features thereof, will best be understood by reference to the following description taken in conjunction with the accompanying drawings, FIGURES 1–9.

FIGURES 1 and 2 illustrate one embodiment of the invention.

Figure 1:
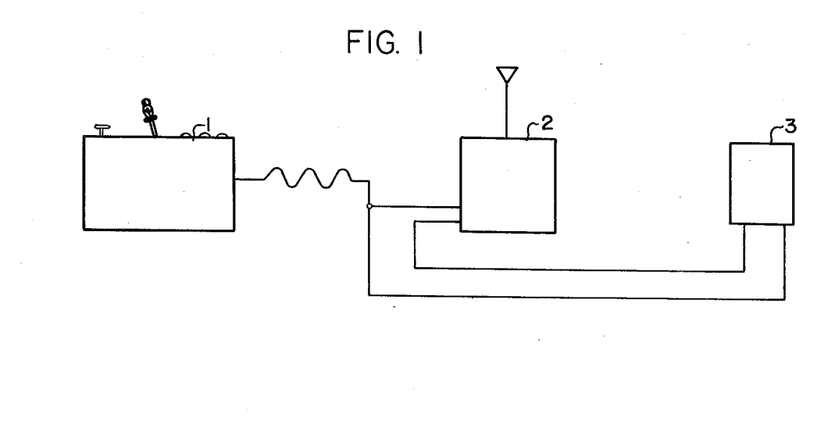
FIGURE 1 shows diagrammatically the controlling apparatus placed at any remote position.
Figure 2:
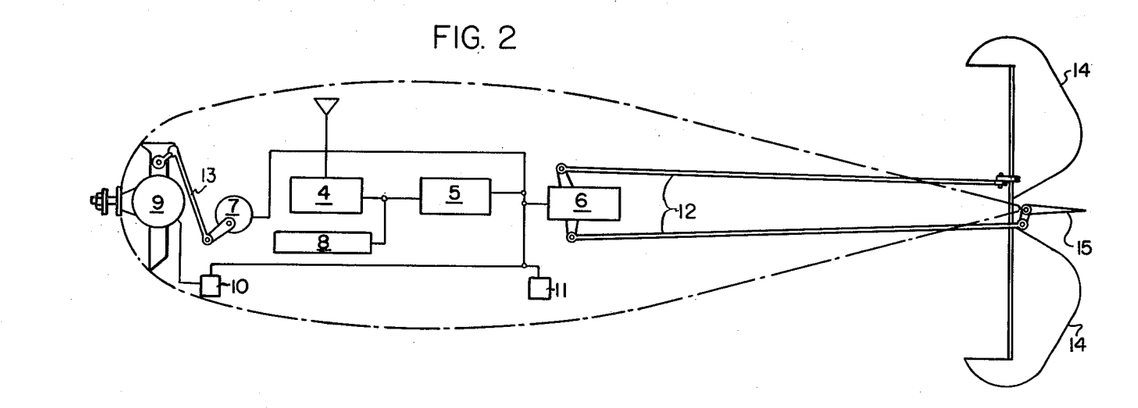
FIGURE 2 is a top view showing the controlled apparatus in an airplane.

Referring now more particularly to FIGURES 1 and 2, the controlling apparatus of FIGURE 1 comprises a controller 1 having controls which are the duplicate, in mode of operation, of an airplane's standard controls and produce certain signal codes when the controls have been operated, a transmitter 2 receiving the code from the controller 1 and sending a modulated carrier wave of a certain radio frequency matching the code of the controller 1, and power means 3 for the transmitter 2, and the controller 1. FIGURE 2 comprises, in an airplane, a radio receiver 4 tuned to the carrier frequency of the transmitter 2, receiving and passing to the selector 5 the signal code from the controller 1, a self-synchronizing motor mechanism 6 commonly called a servo controlled by the selector 5 to operate the elevator 14 or the rudder 15 by means of the lever mechanism 12, another servo 7 controlled by the selector 5 to control the engine 9 by means of the lever mechanism 13, and an ignition engine switch 10 and another control 11 controlled by the selector 5, and power means 8. In very large aircraft, because of high airloads on the elevator and rudder, an auxiliary power boost (not shown) assisting servo 6 may be used. An alternative arrangement might be used to replace servo 6 with a servo (not shown) having a more powerful motor to drive the control surfaces and combine motor 265 and disk 285 with selector 5 into a single unit called an analyzer (5 and 6). The motor 265 would be synchonized with the new servo motor by any well known method. For medium sized and smaller aircraft where the air loads are comparatively low, the size of the motor in the servo can be small; thus, the inertia of the motor-disk combination will be low and overrun at a minimum. In the following explanation, servo 6 is the only power means required to move the elevator 14 or rudder 15. To operate the controlled airplane the operator merely operates the controls on the controller 1 as he would the standard controls of the airplane.

Now turning to a detailed description of the controller 1, the selector 5, servo 6, and servo 7 reference is made to FIGURES 3, 4, 5 and 7. The controller 1 will be described first. It may be incorporated into a standard airplane cockpit or may be enclosed in a small portable box as shown in FIGURE 1.

Figure 3:
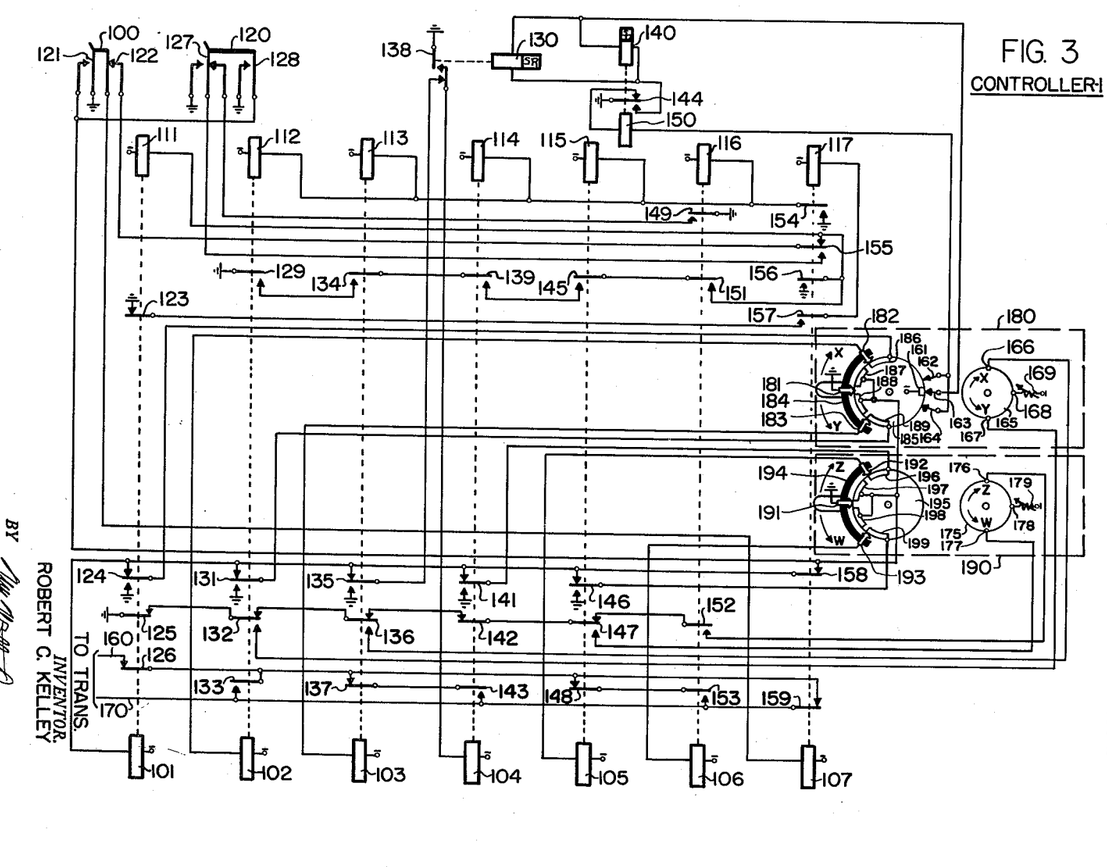
FIGURE 3 shows the operating controls of the instant embodiment.
Figure 7:
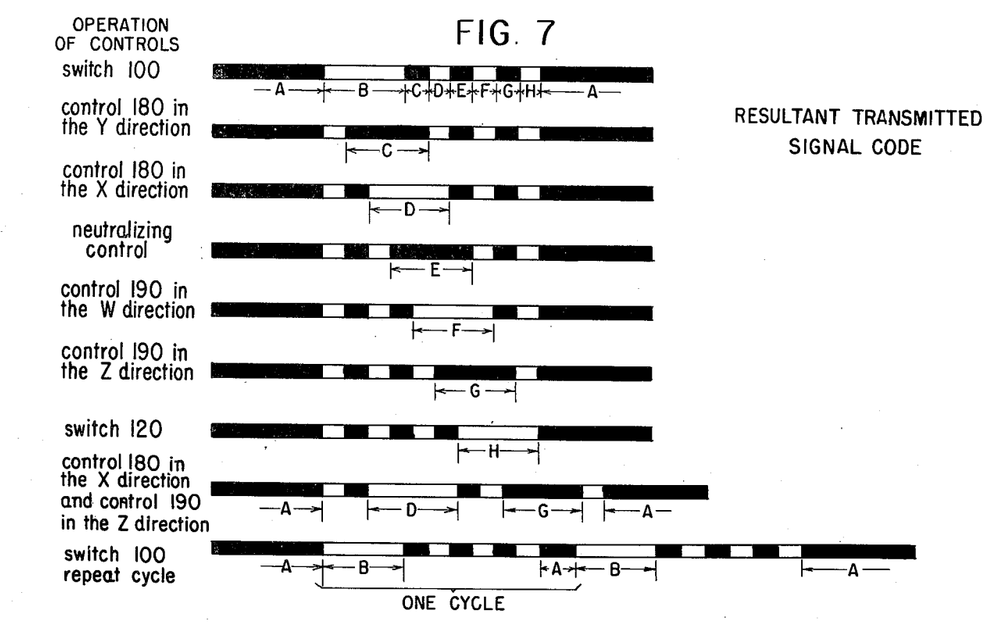
FIGURE 7 in the form of a chart shows a typical signal code or modulation of the carrier wave for the operation of each control and the resultant modulated carrier wave or signal code when two controls are operated simultaneously.

Referring particularly to FIGURE 3, seven control selections are shown, switch 100 which can operate the ignition control 10 in FIGURE 2, switch 120 which can operate the control 11 in FIGURE 2, throttle lever control 190 which can operate the engine throttle servo 7 in FIGURE 2, and stick control 180 which can operate the rudder or elevator servo 6 in FIGURE 2 in conjunction with the neutralizing circuit for rudder or elevator control. A single stick could be used to operate both elevator and rudder or aileron simultaneously. These controls when operated result in the selection of seven signal codes which are transmitted to the receiver for operation of the remote controls. These seven controls need not be operated in any particular sequence, and two or more controls can be operated simultaneously. The resultant modulations of the carrier wave are graphically shown in FIGURE 7. In the left-hand column of FIGURE 7 is a list of the seven control selections and to the right of these listed selections is a graphic showing of the modulated carrier waves applicable to the operation of each control, and to the operation of two controls, operated simultaneously. Using the operation of switch 100 as an example the graph shows the modulated carrier wave over a period of time, during part of which switch 100 was operated. The period B—A is one cycle of operation. The A periods are periods when no controls are operated and the equipment is at rest and the carrier wave is steadily transmitted and the A periods are also the concluding steps of each cycle. The period B represents the period of time during which switch 100 was operated. This is a period of interruption of the carrier wave of a length dependent on the length of time switch 100 was operated. The periods C—H are short periods of code sent as the controller 1 automatically steps through the remainder of the cycle. The period C is different than the period B in that period C represents the rate at which control stick 180 is being moved in the Y direction instead of the length of time it is operated. The important factors for this control are rate and displacement. Rate is represented by the length of the respective signal and displacement by the number of cycles repeated during which the length of the signal may be made to vary between a minimum and a maximum. Periods D—G are comparable to pulse C, and period H is comparable to pulse B. If at the end of a cycle a control is still being operated or another control is operated the cycle will be repeated with the same or correspondingly different carrier wave modulation or signal code depending upon which control is operated and the manner in which that control is operated. FIGURE 7 also shows the modulation of the carrier wave when two controls are operated simultaneously. It can easily be seen that two particular periods in the cycle are of a length dependent upon the operation of the two controls. The present invention is not limited to seven control selections, and it will be obvious that more can easily be added. The description has been limited to seven control selections for purposes of simplicity of description.

FIGURE 3 shows a closed circuit leading to the radio transmitter 2 of FIGURE 1 by way of conductor 160, springs 126 and 159, and conductor 170. The transmitter 2 is arranged to steadily send a carrier wave during the periods between cycles of operation. Referring to FIGURE 7 these are the periods designated A. The circuit may be readily changed to have a carrier wave sent by the transmitter only when the controls are operated.

Assuming now that switch 100 is operated, a circuit may be traced from ground, springs 121 and 158, and relay 101 to battery. Another circuit may be traced from ground, springs 121, 158 and 124, contacts 186 and 182, relay 102 to battery. Another circuit may be traced from ground, springs 121, 158 and 131, contacts 189 and 183, relay 103 to battery. Another circuit may be traced from ground, springs 121, 158, 135 and 138, relay 104 to battery. Another circuit may be traced from ground, springs 121, 158 and 141, contacts 196 and 192, relay 105 to battery. Another circuit may be traced from ground, springs 121, 158 and 146, contacts 199 and 193, and relay 106 to battery. Relays 101–106 then operate the holding circuits for relays 102–106 are completed a springs 124, 131, 135, 141 and 146. Relay 101 breaks the circuit to the transmitter at spring 126 and the transmitted carrier wave is interrupted, and the operation of relays 101–106 results in the operation of relay 111 over the following circuit: ground, springs 129, 134, 139, 145 and 151, and relay 111 to battery.

The springs of relays 101–107 and 111–117 are so adusted that the make contacts close before the break contacts open. Relays 111–117 are so placed that they aid magnetically in the rapid retraction of the armatures of relays 101–107 and consequently decrease the stepping cycle time of the controller 1. While relays 101–107 are energized, a subsequent operation of relays 111–117 will not affect the armatures, but on the deenergization of relays 101–107, relays 111–117 will operate the armatures in the opposite direction, and a further energization of relays 101–107 will not affect the armatures until relays 111–117 begin to deenergize.

To continue with the operation of switch 100, the relays 101–106 and 111 remain operated and the carrier wave will remain interrupted until the switch 100 is returned to normal. Referring to FIGURE 7 this is the period in the cycle shown as B. When switch 100 is returned to normal the energizing circuit for relay 101 is opened at spring 121, and an energizing circuit for relay 107 is completed at spring 122. It may be traced from ground, springs 129, 134, 139, 145, 151, 155 and 122, and relay 107 to battery. Relay 107 operates and closes an obvious circuit for the operation of relays 112–116, and prepares a circuit for the operation of relay 117 at spring 157. Relay 107 also completes a holding circuit for relay 111 at spring 156, and a holding circuit for relay 107. This latter circuit may be traced from ground, springs 149, 127, 155 and 122, and relay 107 to battery. Relay 101 then deenergizes, completing the energizing circuit for relay 117 at spring 123 which then energizes, and removing ground from spring 124. The latter operation causes relay 102 to deenergize which in turn removes ground from spring 131, which causes relay 103 to deenergize which in turn removes ground from spring 135, which causes relay 104 to deenergize which in turn removes ground from spring 141, which causes relay 105 to deenergize which in turn removes ground from spring 146, which causes relay 106 to restore. A number of rapid closures and interruptions of the circuit to conductors 160 and 170 take place as relays 101–106 step through the cycle after switch 100 has been returned to normal, but these are ineffective to operate any controls because of the extremely short duration of the periods during which the circuit is closed and interrupted, due to the effects of relays 111–116. These are the short periods shown in FIGURE 7. The deenergization of relay 106 causes ground to be removed from the holding circuit for relay 107, which in turn causes relay 107 to restore. When relay 107 restores the circuit to conductors 160 and 170 is again complete and the carrier wave is transmitted. This is the A period again, shown in FIGURE 7. The restoration of relay 107 also breaks the holding circuit for relay 111 and the energizing circuits for relays 112–117. The controller 1 is now normal and ready for another operation.

Controls 180 and 190 are similar in construction except that stick control 180 includes part of the neutralization circuit to be described below. Each control has a motor, 165 and 175, capable of rotation in two directions, in the X or Z direction when ground is connected to contact 166 or 176 respectively, and in the Y or W direction when ground is connected to contact 167 or 177 respectively. Battery is connected to the motors at contacts 168 and 178 through the variable resistors for speed control, 169 and 179. Each motor is coupled by a shaft and speed reducer to insulated disks 185 and 195. The design and operation of this equipment inherently reduces the effects of overrun but the addition of an electro-magnetic brake for each motor is recommended to further reduce overrun. Each insulated disk 185 and 195 has four contacts on the periphery of the disk, 186, 187, 188, 189 and 196, 197, 198, 199. On the periphery of each disk 185 and 195 there is an insulated saddle 184 and 194, rotatable about the axis of rotation of each disk 185 and 195. Projecting through each saddle 184 and 194 and contacting each disk 185 and 195 are three contacts 182, 181, 183 and 192, 191, 193. As mentioned above stick control 180 includes part of the neutralization circuit. This part consists of three stationary contacts 162, 163 and 164, in contact with the periphery of the insulated disk 185. On the periphery of the disk 185 directly opposite to a point midway between contacts 186, 187, 188 and 189 lies a contact 161 connected to battery. The operation of the neutralization circuit will be described below.

Assume now that the saddle 184 is rotated in the X direction. A circuit may now be traced from ground, contacts 181 and 187, spring 158, and relay 101 to battery. Another circuit may be traced from ground, contacts 181 and 187, springs 158 and 124, contacts 186 and 182, and relay 102 to battery. Another circuit may be traced from ground, contacts 181, 187, 188 and 183, and relay 103 to battery. Another circuit may be traced from ground, contacts 181 and 187, springs 158, 135 and 138, and relay 104 to battery. Another circuit may be traced from ground, contacts 181 and 187, springs 158 and 141, contacts 196 and 192, and relay 105 to battery. Another circuit may be traced from ground, contacts 181 and 187, springs 158 and 146, contacts 199 and 193, and relay 106 to battery. These circuits result in the energization of relays 101–106. And as previously described these relays close holding circuits at spring 124, 135, 141 and 146, for relays 102, 104, 105 and 106 respectively, and break the circuit to the transmitter at spring 126. The operation of relays 101–106 also result in the operation of relays 107 and 111 over the following circuits: ground, springs 129, 134, 139, 145 and 151, relay 111 to battery, and ground, springs 129, 134, 139, 145, 151, 155 and 122, and relay 107 to battery. The carrier wave sent by the transmitter is thus interrupted. The energization of relay 107 results in the energization of realys 112–116 over an obvious circuit, completes holding circuits for relays 107 and 111, prepares a circuit for the energization of relay 117, and breaks the energization circuits for relays 101, 102, 104, 105 and 106 at spring 158. Relay 101 then restores, resulting in a completion of the transmitter circuit from conductor 160, spring 126 and 133 to conductor 170, and the carrier wave is then sent by the transmitter. Now the deenergization of relay 101 also results in the breaking of the holding circuit for relay 102 at spring 124. Relay 102 restores, breaking the transmitter circuit at spring 133, resulting in an interruption of the carrier wave. Now the controller 1 would remain in this state as long as the saddle 184 and the disk 185 position relationship would remain as operated, but the deenergization of relay 102 also results in the following circuit to the motor 165: ground, springs 125, 132 and 136, contact 166, motor 165, contact 168 and resistor 169 to battery. Motor 165 will then operate, rotating disk 185 in the X direction. When the disk 185 catches up with the saddle 184, the disk 185 and the saddle 184 will have the relative position shown in FIGURE 3. The previously described circuit for relay 103 will be opened at contact 181 and relay 103 will restore, and the motor circuit will be opened at spring 136. When relay 103 restores the transmitter circuit will be completed at spring 137, and the carrier wave will again be sent. The period thereby completed is shown as D in FIGURE 7. The holding circuit for relay 104 will be broken at spring 135 and the controller 1 will step through the rest of its cycle as previously described for the operation of switch 100.

To further describe the rate control feature of stick control 180, the motor 165 will accelerate to greater speeds over greater periods of time. Now if the saddle 184 is slowly moved in the X direction, the controller 1 will step down to the control 180, the motor 165 will be operated and the disk 185 will catch up with the saddle 184, motor 165 will be shut off, and the controller 1 will step through the rest of the cycle. As the saddle 184 is still being moved the cycle will be repeated a number of times until the saddle 184 is stopped. Now as the saddle 184 was slowly moved, the off-normal increment of movement was small, and the motor 165 has but a small angle through which to rotate disk 185 before catching the saddle 184 thus the average speed of the disk was low. This will result in the transmission of a number of series of code periods, with one of the periods in each series, the D period in FIGURE 7, corresponding in length to the speed of operation of the operation control 180. These series of code periods will result in a comparable slow movement of the operated control at the remote position as will be described below. Now if the saddle 184 is moved rapidly in the X direction, the off-normal increment of movement will be much greater and the motor 165, although accelerating, will have a greater angle of rotation through which to move the disk 185 and therefor will take a longer period of time to cause the disk 185 to catch up with the saddle 184 thus the average speed of the disk was high. This will result in a smaller number of series of code periods, with the one period in each series, the D period in FIGURE 7, corresponding in length to the speed of operation of the operating control and being longer than the comparable code periods sent when the saddle 184 is moved slowly. These series of code periods will result in a rapid movement of the operated control at the remote position as will be described below. The above described rate control is achieved in the same manner if the saddle 184 is moved in the Y direction, the C period of FIGURE 7 is varied in length, or if the saddle 194 of control 190 is moved in either the Z or W directions, the G and F periods respectively of FIGURE 7 are varied in length.

Assume now that the saddle 184 is moved in the Y direction. A circuit may be traced from ground, contacts 181 and 188, spring 158, and relay 101 to battery. Another circuit may be traced from ground, contacts 181, 188, 187 and 182, and relay 102 to battery. Another circuit may be traced from ground, contacts 181 and 188, springs 158 and 131, contacts 189 and 183, and relay 103 to battery. Another circuit may be traced from ground, contacts 181 and 188, springs 158, 135 and 138, and relay 104 to battery. Another circuit may be traced from ground, contacts 181 and 188, springs 158 and 141, contacts 196 and 192, and relay 105 to battery. Another circuit may be traced from ground, contacts 181 and 188, springs 158 and 146, contacts 199, and 193, and relay 106 to battery. These circuits result in the operation of relays 101–106, which complete holding circuits for relays 103, 104, 105 and 106 at springs 131, 135, 141 and 146 respectively. The circuit to the transmitter is opened at spring 126 which causes the transmission of the carrier wave to be interrupted. Relays 107 and 111 are energized over circuits described above. The energization of relay 107 results in the energization of relays 112–116 over an obvious circuit, completes holding circuits for relays 107 and 111, prepares a circuit for the energization of relay 117, and breaks the energization circuits for relays 101, 103, 104, 105, 106 at spring 158. Relay 101 then restores, completing the transmitter circuit at spring 126, causing the carrier wave to again be sent. Now the controller 1 would remain in this state as long as the saddle 184 and the disk 188 position relationship would remain as operated, but the deenergization of relay 101 completes at spring 125 the following motor circuit: ground, springs 125 and 132, contact 167, motor 165, contact 168, and resistor 169 to battery. Motor 165 operates, rotating disk 185 in the Y direction. When the disk 185 catches up with the saddle 184, the disk 185 and the saddle 184 will have the relative position shown in FIGURE 3. The previously described circuit for the energization of relay 102 will be opened at contact 181 and relay 102 will restore, and the motor circuit will be opened at spring 132. When relay 102 restores the transmitter circuit will again be opened at spring 133 and the carrier wave will be interrupted, resulting in the period shown as C in FIGURE 7. Also the holding circuit for relay 103 will be broken at spring 131 and the controller 1 will step through the rest of the cycle as previously described. The cycle will be repeated until movement of the saddle 184 in the Y direction is stopped.

The operation of the neutralization control will now be described. The neutralization control in this embodiment has been associated with the operation of stick control 180, although it could also have been applied to control 190. The term "normal" or "neutral" position does not necessarily mean the midpoint of control travel. For elevator or rudder it would be approximately the midpoint of travel but for throttle control it would likely be an off center setting for cruise condition. The neutralization control comprises the described elements in the stick control 180 and the three relays 130, 140 and 150. Assume for purposes of explanation that saddle 184 has been moved in the direction Y. As previously described the relays of the controller operate in sequence to a point determined by the operation of the control 180, and the motor 165 starts to rotate the disk 185 to catch up with the saddle 184. As the disk 185 begins to rotate in the Y direction, contact 161, connected to battery, makes contact with contact 162, thereby causing the operation of relay 150 over an obvious circuit. Spring 144 is so constructed that it will snap and remain in the direction that it is operated, therefor spring 144 will snap and remain towards relay 150. Now as the saddle 184 is moved back to normal position, the disk 185 will follow the saddle as previously described. Now when the disk 185 reaches normal position, relays 130 and 140 will be energized over the following circuit: ground, spring 144, relays 130 and 140, contacts 163 and 161 to battery. Relay 140 is a slow to operate relay and will not operate at this time, relay 130, a slow to release relay, will operate and at spring 138 will connect ground to spring 138 and to the winding of relay 104. Relay 140 after a short interval will then operate, causing spring 144 to be snapped back and to remain towards relay 140. The operation of relay 130 at the make-before-break contacts 138 momentarily grounds the common start conductor through the armature and break-contact 135 to cause all of the relays 101 to 107, inclusive, to operate as previously described. When the normally closed contacts controlled by contact 138 open, the momentary ground to the start conductor is removed to start the sequential restoration of relays 101, 102 and 103. Relay 104 is delayed in its restoration over a circuit including grounded contact 138 until relay 130 restores. Meanwhile relay 130 holds relay 104 operated for a predetermined maximum time period in spite of the opening of its circuit at springs 135 of relay 103 causing the transmitter circuit to be completed for that time period, and consequently causing the carrier wave to be sent for that time interval. That period is shown as the pulse E in FIGURE 7. If the saddle is moved rapidly past the neutral point the relays 130 and 140 are not affected. If the saddle is moved more slowly past the neutral point relay 130 will operate but relay 140 may not operate, and if the saddle is moved still more slowly past the neutral point, relays 130 and 140 will both operate. The predetermined maximum length of period E is dependent on relays 130 and 140 both operating, but if only relay 130 operates the length of period E will be less than the maximum and greater than the stepping minimum. Each time the neutral point is crossed or stopped at, the position of the remote control will be corrected if it is not exactly in synchronism. Thus, by using this neutralization circuit with motors having nearly identical acceleration characteristics or with a standard type of self-synchronizing system (not shown) both the operated control and the remote position control will indicate the exact position of the other. How the pulse E neutralizes the comparable operated control at the remote position will be described below. When relay 130 restores the controller will step through the rest of its cycle.

Throttle lever control 190 operates in a manner similar to the operation of stick control 180. If saddle 194 is rotated in the W direction, ground will be present at spring 158 and will result in the operation of relays 101, 102, 103, 104 and 106 over previously described circuits. Relay 105, the control relay here, will be operated over a circuit not including spring 158 but as follows: ground, contacts 191, 198, 197 and 192, and relay 105 to battery. Relay 107 and 111–117 will be operated, and the controller 1 will step down to relay 105, the carrier wave being transmitted and interrupted, as previously described. The motor 175 will then be operated over the following circuit: ground, springs 125, 132, 136, 142 and 147, contact 177, motor 175, contact 178, and resistor 179 to battery. The motor will then rotate the disk 195 in the W direction until contact 191 is between contacts 197 and 198 at which time the previously described circuit for the operation of relay 105 will be opened and relay 105 will restore, completing at spring 148 the transmitter circuit, causing the carrier wave to be sent again, resulting in the completion of the period shown as F in FIGURE 7. The controller 1 will then step through the rest of the cycle. Of course, if at the end of the cycle the saddle 194 is still being rotated in the W direction the cycle will be repeated.

Now if the saddle 194 is rotated in the Z direction, relays 101, 102, 103, 104 and 105 will be operated by ground on spring 158, and relay 106 will be operated over the following circuit; ground, contacts 191, 197, 198 and 193, and relay 106 to battery. Therefore when relay 107 operates removing ground from spring 158, the controller 1 will step down to relay 106. At which time the motor 175 will be operated over the following circuit: ground, springs 125, 132, 136, 142, 147 and 152, contact 176, motor 175, contact 178, and resistor 179 to battery. Motor 175 will then rotate the disk 195 the amount necessary in the Z direction to break the energizing circuit previously described for relay 106. Relay 106 will restore, the carrier wave being transmitted will be interrupted, resulting in the completion of the period shown as G in FIGURE 7, and the controller 1 will step through the rest of the cycle.

Assume now that switch 120 is operated. A circuit may be traced from ground, springs 128 and 158, and relay 101 to battery. Another circuit may be traced from ground, springs 128, 158 and 124, contacts 186 and 182, and relay 102 to battery. Another circuit may be traced from ground, springs 128, 158 and 131, contacts 189 and 183, and relay 103 to battery. Another circuit may be traced from ground, springs 128, 158, 135 and 138, and relay 104 to battery. Another circuit may be traced from ground, springs 128, 158 and 141, contacts 196 and 192, and relay 105 to battery. Another circuit may be traced from ground, springs 128, 158 and 146, contacts 199 and 193, and relay 106 to battery. These circuits result in the operation of relays 101–106. The operation of relays 101–106 in turn cause the operation of relays 107 and 111 over previously described circuits. The operation of relay 107 causes the operation of relays 112–116 over an obvious circuit, prepares a holding circuit for relay 111 at spring 156, and prepares an energizing circuit for relay 117 at spring 157. A holding circuit for relay 107 is completed from ground, springs 127, 155 and 122, and relay 107 to battery. The operation of relay 107 also opens the energizing circuits for relays 101–106. Relays 101–106 will then step down to relay 107, alternately completing and interrupting the transmitter circuit as previously described. At this point relays 101–106 will have restored, relay 107 will be energized, and the transmitter circuit will be open, and the carrier wave will be interrupted. The controller 1 will remain in this state until the switch 120 is returned to normal. When the switch 120 is returned to normal, the holding circuit for relay 107 will be broken at spring 127, and relay 107 will restore. When relay 107 restores the holding circuit for relay 111, and the energizing circuits for relays 112–117 are opened and these relays restore. The controller 1 is normal again, the carrier wave is being sent, the period shown as H in FIGURE 7 is ended, and the controller 1 may be reoperated.

It is apparent from the above descriptions that as the controller 1 steps through a cycle, any control that is operated affects the length of the signal period corresponding to that control, and it is also apparent that any number of controls may be operated simultaneously since each control only affects its period in the cycle. The continued simultaneous operation of more than one control results in the sending of a series of code periods, with each operated control determining the length of its corresponding period in each series of code periods. How this will result in the simultaneous operation of more than one control at the remote position will be described below.

Figure 4:
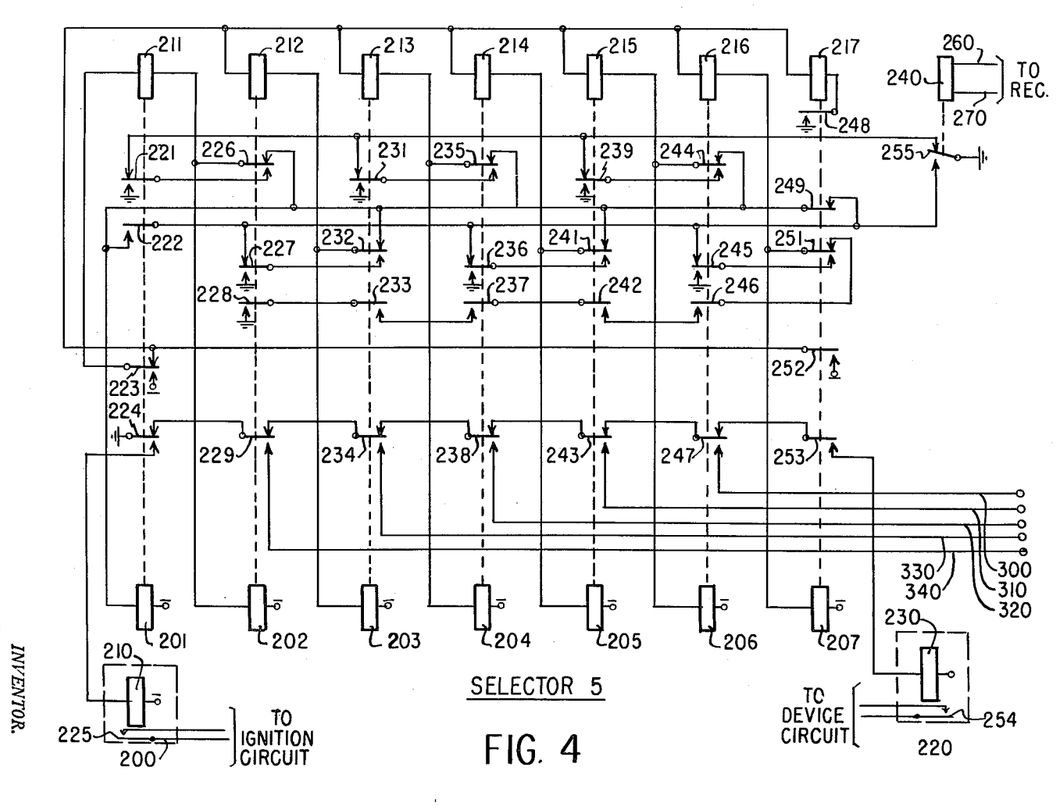
FIGURE 4 shows part of the operated controls of the instant embodiment.
Figure 5:
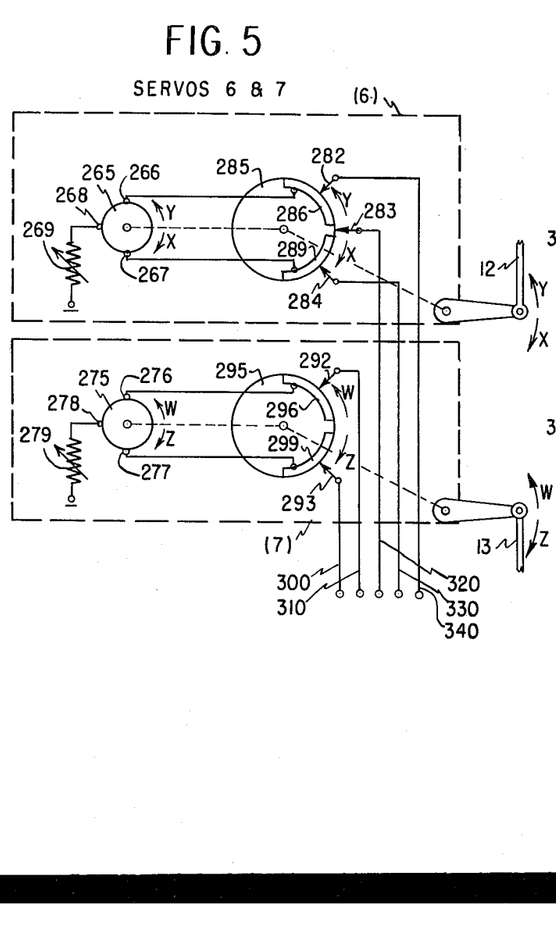
FIGURE 5 shows the remainder of the operated controls of the instant embodiment.

The selector 5 and servos 6 and 7 will now be described in detail. Servos 6 and 7 can be replaced with the servo in FIGURE 9 as they are different methods of accomplishing the same results. Referring particularly to FIGURES 4 and 5, seven controls selections are shown, control 200 which can be the ignition switch 10 in FIGURE 2, control 220 which can be the control 11 in FIGURE 2, control 6 (three selections) which can be the elevator or rudder servo 6 in FIGURE 2 including the neutralizing control described in the controller 1 in FIGURE 3, and control 7 (two selections) which can be the engine throttle servo 7 in FIGURE 2. These seven control selections are operated by the selector 5 in response to seven signal codes received by the receiver which in turn are passed to the selector 5. These signal codes are received over conductors 260 and 270 to operate relay 240. Relay 240 is shown as normally operated in accordance with the present embodiment wherein the transmitter sends a carrier wave when no controls are operated.

The double relay design described in the controller 1 is also used in the selector 5. The springs of relays 201–207 and 211–217 are so adjusted that the make contacts close before the break contacts open. Relays 211–217 aid in the rapid operation of the armature through the stepping cycle. As stated previously this insures the non-operation of the controls by the stepping of the relays between control operating periods.

Assume now that switch 100 in the controller 1 has been operated. As previously described the carrier wave will be interrupted, and this results in the deenergization of relay 240. A circuit may now be traced from ground, springs 255 and 249, and relay 201 to battery. Another circuit may be traced from ground, springs 255, 249 and 226, and relay 202 to battery. Another circuit may be traced from ground, springs 255, 249 and 232, and relay 203 to battery. Another circuit may be traced from ground, springs 255, 249 and 235, and relay 204 to battery. Another circuit may be traced from ground, springs 255, 249 and 241, and relay 205 to battery. Another circuit may be traced from ground, springs 255, 249 and 244, and relay 206 to battery. These circuits result in the operation of relays 201–206. When relay 201 operates an obvious circuit for relay 210 is completed, and relay 210 operates, causing the operation of control 200. When relays 201–206 operated the following holding circuits for relays 202–206 were completed: ground, springs 221 and 226, relay 202 to battery; ground, springs 227 and 232, relay 203 to battery; ground, springs 231 and 235, relay 204 to battery; ground, springs 236 and 241, relay 205 to battery; ground, springs 239 and 244, and relay 206 to battery. Relay 201 also completed an obvious locking circuit at spring 222. The operation of relays 201–206 also completed the following energizing circuits for relays 211 and 207; ground, springs 221 and 226, relay 211, spring 223 to battery; and ground, springs 228, 233, 237, 242, 246 and 251, and relay 207 to battery. Relays 211 and 207 operate and complete the following energizing circuits for relays 212–217: ground, springs 227 and 232, relay 212, spring 252 to battery; ground, springs 231 and 235, relay, relay 213, spring 252 to battery; ground, springs 236 and 241, relay 214, spring 252 to battery; ground, springs 239 and 244, relay 215, spring 252 to battery; ground, springs 245 and 251, relay 216, spring 252 to battery; ground, spring 248, relay 217, and spring 252 to battery. Relays 212–217 operate. The operation of relay 207 also results in a break in the energizing circuits for relays 201–206 at spring 249, and in the completion of a holding circuit for relay 207 at spring 251. The selector 5 will remain in this condition, control 200 operated, until switch 100 in the controller 1 is returned to normal. When that switch is returned to normal the carrier wave will again be sent by the transmitter, and received by the receiver to again cause the operation of relay 240 over conductors 260 and 270. When relay 240 operates it opens the holding circuit for relay 201. Relay 201 restores, opening the energizing circuit for relay 210 thereby causing control 200 to restore. Relay 201 also breaks the energizing circuit and completes a holding circuit for relay 211 at spring 223. When spring 221 restores an obvious alternate holding circuit for relays 202 and 211 is completed. Now, as described previously, the controller 1 will step through the remainder of its cycle, alternately sending and interrupting the carrier wave. Therefore the carrier wave will next be interrupted and relay 240 will restore, opening the holding circuit for relays 202 and 211 at spring 255. Relays 202 and 211 restore. Relay 202 completes an obvious alternate holding circuit for relays 203 and 212 at spring 227. The carrier wave will next be received and relay 240 will energize, opening the holding circuits for relays 203 and 212 at spring 255. Relays 203 and 212 restore. Relay 203 completes an obvious alternate holding circuit for relays 204 and 213 at spring 231. The carrier wave will next be interrupted and relay 240 restores, opening the holding circuits for relays 204 and 213 at spring 255. Relays 204 and 213 restore. Relay 204 completes an obvious alternate holding circuit for relays 205 and 214 at spring 236. The carrier wave will next be received and relay 240 operates, opening the holding circuits for relays 205 and 214 at spring 255. Relays 205 and 214 restore. Relay 205 completes an obvious alternate holding circuit for relays 206 and 215 at spring 239. The carrier wave will next be interrupted and relay 240 restores, opening the holding circuits for relays 206 and 215 at spring 255. Relays 206 and 215 restore. Relay 206 completes an obvious alternate holding circuit for relays 207 and 216 at spring 245. The carrier wave will next be received and relay 240 will operate, opening the holding circuits for relays 207 and 216 at spring 255. Relays 207 and 216 restore. Relay 207 opens the energizing circuit for relay 217 at spring 248. Relay 217 restores. The controller 1 and the selector 5 have now completed their cycles and the carrier wave is again being transmitted and received, and the selector 5 is ready to operate again.

It can be seen from the foregoing description that if any of the code periods are longer than a normal short stepping period the relay in the selector 5 corresponding to that period will remain operated for the length of the period, and the control associated with that relay will be operated for the length of the period, therefore it can be seen that simultaneous operation of more than one control is achieved. It should be noted again that the normal short stepping periods are too rapid to operate any controls.

It was seen how control 200 was operated, now let it be assumed that the saddle 184 in controller 1 is rotated in the Y direction. This will result in the controller 1 stepping down to the control period, the transmitter sending a code period of the length necessary for the disk 185 to catch up with the saddle 184, and the controller 1 stepping through the rest of the cycle. This results in a complete signal code. The receiver receives the signal code and passes it to the selector 5. The selector 5 will step down to the control relay, and will result in the energization of relay 202 for the length of the code period. At the end of the period the selector 5 will step through the rest of the cycle. The same will follow if the other controls in the controller 1 are operated. If the saddle 184 is rotated in the X direction, the relay 203 will remain energized for the length of the period necessary for the disk 185 to catch up to the saddle 184. If the saddle 184 has been rotated in any direction, passing across or stopping at the neutral point, the relay 204 will remain energized for the length of the period necessary for neutralization of the control 6. If the saddle 194 is rotated in the W direction, the relay 205 will remain energized for the length of the period necessary for the disk 195 to catch up to the saddle 194. If the saddle 194 is rotated in the Z direction, the relay 206 will remain energized for the length of the period necessary for the disk 195 to catch up to the saddle 194. And lastly, if the switch 120 is operated, the relay 207 will remain energized for the length of the period corresponding to the length of time switch 120 is maintained operated.

The controls 6 and 7 are similar in construction except that control 6 includes the neutralization circuit. Each control has a motor, 265 and 275 capable of rotation in two directions, in the X or Z direction when ground is connected to contact 267 or 277 respectively, and in the Y or W direction when ground is connected to contact 266 or 276 respectively. Battery is connected to the motors at contacts 268 and 278 through the variable resistors for speed control, 269 and 279. Each motor is coupled by a shaft and speed reducer (not shown) to insulated disks 285 and 295. Each motor has an electromagnetic brake to prevent overrun. Each insulated disk 285 and 295 has two contacts on the periphery of the disk, 286, 289 and 296, 299. In contact with the latter described contacts are four stationary contacts, one on each contact, 282 on 286, 284 on 289, 292 on 296, and 293 on 299. Control 6 has in addition a third stationary contact, placed on the periphery of the disk 285 and midway between the two contacts 286 and 289. This contact 283 is the contact for the neutralizing circuit. The airplane controls at the remote position, 14 or 15 and 9 of FIGURE 2, associated with controls 6 and 7 are operated from the motors 265 and 275 by means of lever mechanisms 12 and 13 attached to the speed reducer.

To further describe the operation of the controls, assume that relay 202 is held energized for a certain length of time due to the saddle 184 in the controller 1 being moved in the Y direction. A circuit may be traced from ground, springs 224 and 229, conductor 340, contacts 282, 286 and 266, motor 265, contact 268, and resistor 269 to battery. This circuit will result in the operation of the motor 265 in the Y direction for the period relay 202 remains energized.

Next, assume that relay 203 is held energized for a certain period due to the saddle 184 in the controller 1 being moved in the X direction. A circuit may be traced from ground, springs 224, 229 and 234, conductor 330, contacts 284, 289 and 267, motor 265, contact 268, and resistor 269 to battery. This circuit will result in the operation of the motor 265 in the X direction for the period relay 203 remains energized.

Next, assume that relay 204 is held energized for a certain period due to the saddle 184 having been moved in some direction and returned to or past normal. Further assume that disk 285 and motor 265 did not return exactly to normal. A circuit may now be traced from ground, springs 224, 229, 234 and 238, conductor 320, contact 283 and either contacts 286 and 266, motor 265, contact 268, resistor 269 to battery or contacts 289 and 267, motor 265, contact 268, and resistor 269 to battery. If the former circuit is completed the motor 265 will rotate the disk 285 in the X direction until contact 283 reaches a point between contacts 286 and 289 at which time the circuit will be opened and the motor 265 and disk 285 will stop, accurately neutralized. If the latter circuit is completed the motor 265 will rotate the disk 285 in the Y direction until contact 283 reaches a point between contacts 286 and 289 at which time the circuit will be opened and the motor 265 and disk 285 will stop, accurately neutralized.

Next, assume that relay 205 is held energized for a certain period due to saddle 194 in the controller 1 being moved in the W direction. A circuit may now be traced from ground, springs 224, 229, 234, 238 and 243, conductor 310, contacts 292, 296 and 276, motor 275, contact 278, and resistor 279 to battery. This circuit will result in the operation of the motor 275 in the W direction for the period relay 205 remains energized.

Next, assume that relay 206 is held energized for a certain period due to saddle 194 in the controller 1 being moved in the Z direction. A circuit may now be traced from ground, springs 224, 229, 234, 238, 243 and 247, conductor 300, contacts 293, 299 and 277, motor 275, contact 278, and resistor 279 to battery. This circuit will result in the operation of the motor 275 in the Z direction for the period relay 206 remains energized.

Next, assume that relay 207 is held energized for a certain period due to switch 120 in the controller 1 being operated. A circuit may now be traced from ground, springs 224, 229, 234, 238, 243, 247 and 253, relay 230 to battery. This circuit will result in the energization of relay 230 and the operation of control 220 for the period relay 207 remains energized.

To further describe the rate control feature as pertinent to the selector 5 and controls or servos 6 and 7, servo 6 will be used as an example. As described previously, a slow movement of the stick control in the controller 1 will result in the transmission of a series of signal codes with the period corresponding to the operated control being short. The selector 5 will step through under control of the series of signal codes, and will cause a small rotation of the control motor 265 in the servo 6 each time the period corresponding to the operated control is reached in each stepping cycle. Now if the stick control in the controller 1 is moved rapidly, the period, in the series of signal codes, corresponding to the operated control will be long, and as the selector 5 steps through each cycle that long period will cause a corresponding rapid movement of the control motor 265 in the servo 6 over a period of time.

Figure 6:
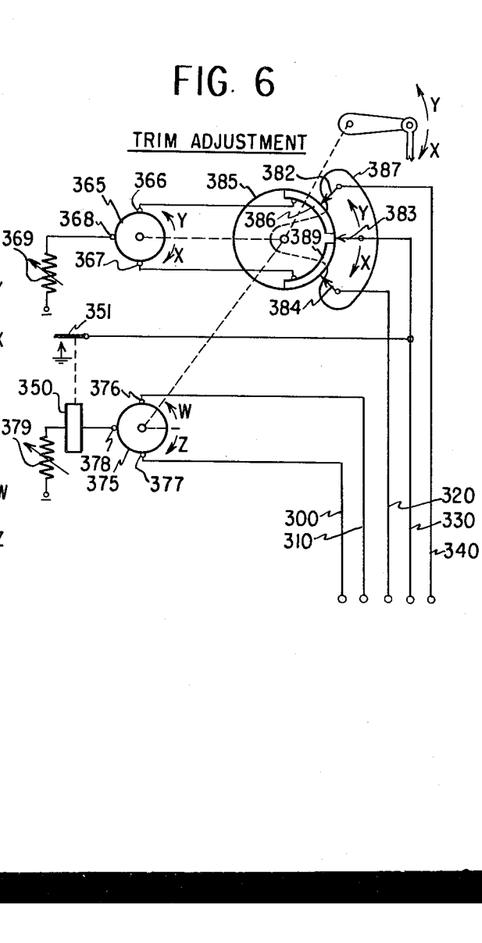
FIGURE 6 shows the trim adjustment controls.

Referring particularly to FIGURE 6, trim adjustment means are shown, whereby a control at the remote at the remote position can be set to maintain any one of several normal positions. The apparatus of FIGURE 6 can be substituted in place of servos 6 and 7 with a selector such as selector 5 shown in FIGURE 4 or the selector 5 can be expanded to include the apparatus of FIGURE 5. In the case of the substitution mentioned then conductors 300–340 are connected to the armature contacts of the stepping relays of the analyzer such as at springs 229, 234, 238, 243 and 247 in FIGURE 4. The apparatus is similar to that shown in FIGURE 5 except that the contacts 382, 383 and 384 are rigidly mounted upon a saddle 387 that is rotatable about the same axis of rotation as the disk 385. Also, the motor 375 is connected by means of a shaft and speed reducer to the saddle 387 which rotates at a constant speed much slower than the speed of which disk 385 is capable, and a relay 350 is placed in series with the motor 375. The controller can be the same controller 1 shown in FIGURE 3 except for the substitution of a unit similar to control 190 but different only in that disk 195, driven by motor 175, rotates at a constant and low speed equal to the speed of saddle 387 in the trim control. Either the above substitution may be made, or the controller can be expanded to provide means for operating this apparatus. In the case of the substitution mentioned, control 190 would provide the trim adjustment for control 180 in FIGURE 3. Now if control 190 is operated some amount for trim, a ground pulse will be present on conductors 300 or 310 and of a length depending upon the amount of trim. Assume for purposes of explanation that the ground pulse is present on conductor 300, due to the fact that the saddle 194 in controller 1, FIGURE 3, was moved in the Z direction. A circuit may be traced from ground, conductor 300, contact 377, motor 375, contact 378, relay 350, and resistor 379 to battery. Relay 350 will operate and motor 375 will operate, rotating the saddle 387 in the Z direction an amount depending on the extent of rotation of the saddle 194. Another circuit can now be traced from ground, armature 351, contacts 383, 389 and 367, motor 365, contact 368, and resistor 369 to battery. Motor 365 will operate, rotating disk 385 in the X direction until contact 383 is between contacts 386 and 389 at which time the circuit for motor 365 will be open, causing the motor 365 to stop. However, saddle 387 is still moving at a slow speed; therefore, motor 365 again starts to operate. This is repeated many times for small increments of movement until the cessation of the ground pulse on 300 stops motor 375 and deenergizes relay 350 leaving the disk 385 trimmed.

Figure 8:
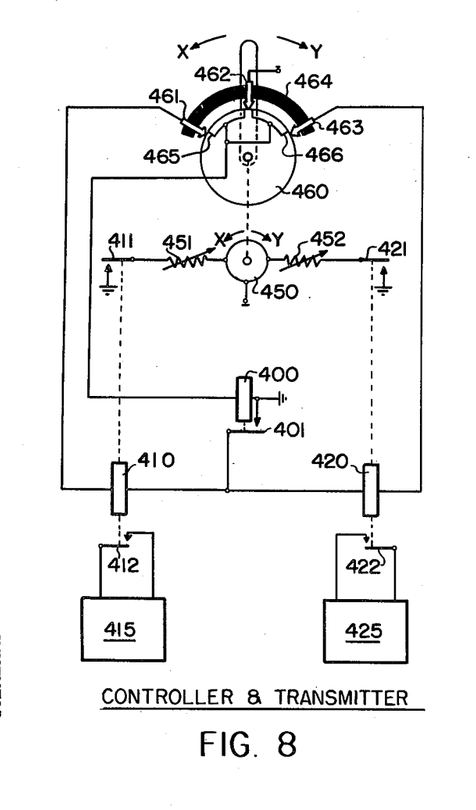
FIGURES 8 and 9 show another modification of the invention as applied to an aircraft.
Figure 9:
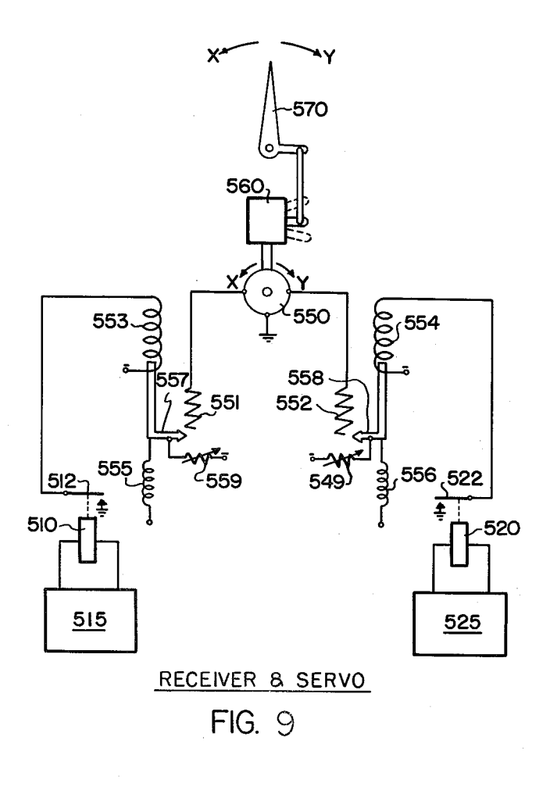

The system described above used one carrier wave and a chain of stepping relays, reference is now made to FIGURES 8 and 9 wherein a system using multiple carrier waves is shown. Any number of carrier waves may be used but the illustration is limited to two. These two carrier waves of different frequencies are produced and sent by the two transmitters 415 and 425. The stick control is similar to that previously described, having a motor 450, capable of operation in two directions, in the X direction when ground is connected to armature 411 and through the speed adjustment resistor 451, to the motor 450, and in the Y direction when ground is connected to armature 421, through the speed adjustment resistor 452, to the motor 450. The motor 450 is connected to an insulated disk 460 by means of a shaft and speed reducer. The disk has two contacts 465 and 466 mounted on the periphery of the disk, and three contacts 461, 462 and 463, make contact with the periphery of the disk 460. The latter contacts are rigidly mounted in a saddle 464, rotatable about the same axis as the axis of rotation of the disk 460. If the saddle 464 is rotated in X direction, the following circuit is completed: ground, relay 400, contacts 465 and 462 to battery. Relay 400 operates. The following circuit for the energization of relay 420 is then completed: ground, spring 401, relay 420, contacts 463, 466, 465 and 462 to battery. Relay 420 operates and causes transmitter 425 to send a carrier wave. Relay 420 also causes the motor 450 to be operated over the following circuit: ground, spring 421, resistor 452, motor 450 to battery. The motor 450 operates in the X direction, rotating the disk 460 until the disk 460 catches up with the saddle 464, opening the circuit for relay 420 at contact 462. Relay 420 restores, the transmitter 425 ceases to send a carrier wave, and motor 450 stops. Relay 400 restores.

If the saddle 464 is rotated in the Y direction, the following circuit is completed: ground, relay 400, contacts 466 and 462 to battery. Relay 400 operates. The following circuit for the energization of relay 410 is then completed: ground, spring 401, relay 410, contacts 461, 465, 466 and 462 to battery. Relay 410 operates causing transmitter 415 to send a carrier wave. Relay 410 also causes the motor 450 to be operated over the following circuit: ground, spring 411, resistor 451, and motor 450 to battery. The motor 450 operates in the Y direction, rotating the disk 460 until the disk 460 catches up with the saddle 464, opening the circuit for relay 410 at contact 462. Relay 410 restores, the transmitter 415 ceases to send a carrier wave, and motor 450 stops. Relay 400 restores.

If the saddle 464 is continuously moved in one direction the cycle will repeat, and as the saddle 464 is moved at a more rapid rate, the motor will have a greater angle through which to rotate the disk 460, taking a greater length of time to catch up to the disk 460, and consequently the carrier wave will be transmitted for a longer period in each cycle. This permits rate control.

FIGURE 9 comprises two receivers for receiving the two transmitted carrier waves of different frequencies, and a servo which transforms the received signals into movements to operate control 570. The servo in FIGURE 9 can be replaced with servo 6 or servo 7, FIGURE 5, as they are different methods of achieving the same results. The servo consists of means keyed to the receivers comprising solenoids 553 and 554, a motor 550 capable of rotation in two directions, the solenoids 553 and 554 causing the resistances 551 and 552 in the motor 550 circuits to be varied to vary the speed of motor 550, and any well known speed reducer 560, operating from the motor 550 to operate the control 570.

Assume that the saddle 464 is rotated in the X direction, as previously described, the transmitter 425 will send a carrier wave. Receiver 525, tuned to the frequency of transmitter 425 will receive this carrier wave, and will in turn energize relay 520. Relay 520 operates and an obvious circuit for the operation of the solenoid 554 is completed. The solenoid 554 will operate against the tension spring 556 to move the contact 558 to some point on the resistor 552 completing an obvious circuit for the operation of motor 550. Motor 550 will operate in the X direction, and control 570 will be operated in the X direction through the speed reducer 560.

Next, assume that the saddle 464 is rotated in the Y direction, as previously described, the transmitter 415 will send a carrier wave. Receiver 515 tuned to the frequency of transmitter 415 will receive this carrier wave, and will in turn energize relay 510. Relay 510 operates and an obvious circuit for the operation of solenoid 553 is completed. The solenoid 553 will operate against the tension spring 555 to move the contact 557 to some point on the resistor 551 completing an obvious circuit for the operation of motor 550. Motor 550 will operate in the Y direction, and control 570 will be operated in the Y direction through the speed reducer 560. The longer the pulse of the carrier wave the greater operation of the solenoids and the less the resistance in the motor 550 circuit, with the result that the control 570 will be operated at a more rapid rate. If the pulses are short the solenoids will hover at a higher resistance value, smaller operation of the solenoids, and the motor 550, having greater resistance in its circuit, will operate at a slower rate, and consequently the control 570 will be operated at a slower rate. Both neutralization and trim control, previously discussed, are adaptable to the servo in FIGURE 9.

Having described the invention, what is considered new and is desired to be secured by Letters Patent is:

1. In a remote control system, a control station, a control device in said control station comprising a motor rotatable in two directions, a disk, disk contacts on the periphery of said disk, means for connecting said disk to said motor, a saddle adjacent to said disk and rotatable about the axis of rotation of said disk, saddle contacts mounted on said saddle in contact with the periphery of said disk, a chain of stepping relays and a control relay, circuit means including said saddle and disk contacts effective in response to the rotation of said saddle and saddle contacts in either direction for simultaneously operating all said chain relays, individual circuits including said saddle and disk contacts and a contact on a preceding chain relay completed for all but the first of said chain relays for maintaining all said chain relays operated except said first chain relay, means for operating said control relay in response to the operation of all said chain relays, means controlled by the operation of said control relay for restoring said first chain relay to thereby initiate the sequential restoration of said chain relays always in the same order, each succeeding chain relay restoring in response to the opening of its individual circuit by the restoration of its preceeding chain relay, additional circuit means including said saddle and disk contacts for delaying the restoration of different ones of said chain relays independent of their individual circuits but dependent upon the direction of rotation of said saddle and its contacts, other circuit means dependent upon the particular chain relay which is delayed in its restoration by said additional circuit means for controlling the direction of rotation of said motor, and the rotation of said motor causing said connecting means to rotate said disk contacts to a position corresponding to the position of said moved saddle contacts to thereby restore said delayed chain relay and to sequentially restore the remaining operated chain relays and said control relay.

2. In a remote control system, a control station, a control device in said control station comprising a motor rotatable in two directions, a disk, disk contacts on the periphery of said disk, means for connecting said disk to said motor, a saddle adjacent to said disk and rotatable about the axis of rotation of said disk in said two directions, saddle contacts mounted on said saddle in contact with the periphery of said disk, a chain of stepping relays, circuit means including said saddle and disk contacts effective in response to the rotation of said saddle contacts in either direction for operating all said chain relays, means responsive to the operation of all said chain relays for initiating the restoration of said chain relays and for sequentially restoring said chain relays always in the same order, delay circuit means including said saddle and disk contacts for delaying the restoration of different ones of said chain relays dependent upon the direction of rotation of said saddle and its contacts, means for causing the rotation of said motor in a particular direction dependent upon the particular chain relay which is delayed in its restoration for causing said connecting means to rotate said disk contacts to a position in correspondence with the position of said moved saddle contacts, said delay circuit means rendered ineffective in response to said disk contacts reaching correspondence with said saddle contacts to thereby restore said delay chain relay and continue the sequential restoration of the remaining operated chain relays.

3. In a remote control system, a control station, a control device in said control station comprising a motor rotatable in two directions, a disk, disk contacts on the periphery of said disk, means for connecting said disk to said motor, a saddle adjacent to said disk and rotatable about the axis of rotation of said disk in said two directions, saddle contacts mounted on said saddle in contact with the periphery of said disk, a chain of stepping relays, circuit means including said saddle and disk contacts effective in response to the rotation of said saddle and saddle contacts in either direction for operating all said chain relays, means responsive to the operation of all said chain relays for initiating the restoration of said chain relays and for sequentially restoring said chain relays always in the same order, delay circuit means including said saddle and disk contacts for delaying the restoration of different ones of said chain relays dependent upon the direction of rotation of said saddle and its contacts, means for causing the rotation of said motor in a particular direction dependent upon the particular chain relay which is delayed in its restoration for causing said connecting means to rotate said disk contacts to a position in correspondence with the position of said moved saddle contacts, said delay circuit means rendered ineffective in response to said disk contacts reaching correspondence with said saddle contacts to thereby restore said delayed chain relay and continue the sequential restoration of the remaining operated chain relays, said motor controlling means becoming ineffective to further rotate said motor in response to said restoration of said delayed chain relay, said chain relays again operating and restoring in the same cycle of operation to again operate said motor to again cause correspondence only in case said saddle contacts are moved in their initial movement beyond said first correspondence with said disk contacts after such first correspondence is accomplished by said motor operation, the extent and rate of the initial movement of said saddle within a predetermined time determining the number of times said chain relays are operated and restored, the amount of time it takes for the disk contacts to reach correspondence with said saddle contacts, and the delay time period of said delayed chain relay.

4. In a remote control system, a plurality of control devices each having a movable member manually movable in two directions and a driven member movable in two corresponding directions, each said driven member normally positioned in correspondence with its movable member, a driving means individual to each control device for driving its individual driven member in said two corresponding directions, a chain of coding devices comprising a pair of coding devices for each control device and each coding device of each pair being individual to one of said directions of movement, circuit means including said movable members and said driven members effective in response to the manual movement of any one of said movable members from correspondence with its driven member for simultaneously activating all said coding devices, means responsive to the activation of all said coding devices for initiating the deactivation of said coding devices and for sequentially deactivating said coding devices always in the same order, delay circuit means including said movable members and said driven members for delaying the deactivation of different ones of said coding devices dependent upon the particular one of said movable members which is manually moved and its direction of movement from correspondence with its driven member, means dependent upon the particular one of said coding devices which is delayed in its deactivation for operating a particular one of said driving means to drive the driven member of said one moved control device in the proper one of said two directions into correspondence with its moved movable member, said delay circuit means rendered ineffective in response to said one driven member reaching correspondence with its moved movable member to thereby deactivate said delayed coding device and continue the sequential deactivation of the remaining activated coding devices.

5. In a remote control system, a plurality of control devices each having a movable member manually movable in two directions and a driven member movable in two corresponding directions, each said driven member normally positioned in correspondence with its movable member, a driving means individual to each control device for driving its individual driven member in said two corresponding directions, a chain of coding devices comprising a pair of coding devices for each control device and each coding device of each pair being individual to one of said directions of movement, circuit means including said movable members and said driven members effective in response to the manual movement of any one of said movable members from correspondence with its driven member for simultaneously activating all said coding devices, means responsive to the activation of all said coding devices for initiating the deactivation of said coding devices and for sequentially deactivating said coding devices always in the same order, delay circuit means including said movable members and said driven members for delaying the deactivation of different ones of said coding devices dependent upon the particular one of said movable members which is manually moved and its direction of movement from correspondence with its driven member, means dependent upon the particular one of said coding devices which is delayed in its deactivation for operating a particular one of said driving means to drive the driven member of said one moved control device in the proper one of said two directions into correspndence with its moved movable member, said delay circuit means rendered ineffective in response to said one driven member reaching correspondence with its moved movable member to thereby deactivate said delayed coding device and continue the sequential deactivation of the remaining activated coding devices, said operated driving means becoming ineffective to further drive said one driven member in response to the deactivation of said delayed coding device, said coding devices again being activated and deactivated in the same cycle of operation to again operate said one driving means to again reach correspondence only in case said moved movable member is moved beyond said first correspondence after such first correspondence is accomplished by said one driving means, the extent and rate of the movement of said moved movable member within a predetermined time determining the number of times said coding devices are activated and deactivated, the amount of time it takes for said one driven member to reach correspondence with its moved movable member, and the delay time period of said delayed coding device.

6. In a remote control system, a chain of stepping relays and a normally operated pulse relay, means for restoring and reoperating said pulse relay in response to a received code comprising as many circuit interruptions and circuit closures as there are chain relays, each circuit interruption and each circuit closure in a received code corresponding to successive ones of said chain relays, means including a movable contact on said pulse relay responsive to the first restoration of said pulse relay for simultaneously operating all said chain relays, a holding circuit including said movable contact for each chain relay, each succeeding holding circuit sequentially completed in response to the restoration of its preceeding chain relay, the first reoperation of said pulse relay operating said movable contact to open the holding circuit of the first of said chain relays to restore said first chain relay and successive restorations and reoperations of said movable contact by said pulse relay sequentially opening successive holding circuits to successive chain relays to thereby sequentially restore said chain relays always in the same order, a control circuit corresponding to each chain relay, means for completing said control circuits one at a time in rapid succession in response to the sequential restoration of said chain relays, means for delaying one of the successive restorations or reoperations of said pulse relay in response to a prolonged circuit interruption or a prolonged circuit closure in said received code to thereby delay the restoration of the corresponding chain relay to maintain its control circuit completed for the time duration of said prolonged circuit interruption or circuit closure, and a device connected to each said control circuit and normally inoperative in response to said rapid successive completions of their control circuits whereby only the device having its control circuit completed for the time duration of a prolonged circuit interruption or circuit closure is operated.

7. A remote control system as claimed in claim 6 wherein the extent of operation of said operated device is dependent upon the length of time of said prolonged circuit interruption or circuit closure of said received code.

8. In a remote control system, a control station and a remote station, a plurality of control devices in said control station, a chain of stepping relays in said control station, means for moving said control devices, means responsive to the movement of any one of said control devices for simultaneously operating all said chain relays, means responsive to the operation of all said chain relays for initiating the restoration of said chain relays and for sequentially restoring said chain relays always in the same order, means for delaying the restoration of different ones of said chain relays dependent upon the particular one of said control devices which is moved, means for transmitting a code comprising as many circuit interruptions and circuit reclosures as there are chain relays in response to the sequential restoration of said relays and for prolonging one of said circuit interruptions or said circuit closures dependent upon the said particular chain relay which is delayed in the sequential restoration of said chain relays, a similar chain of remote stepping relays and a normally operated pulse relay in said remote station, means for restoring and reoperating said pulse relay in response to the receipt of a code transmitted by said transmitting means, each circuit interruption and each circuit closure of said received code corresponding to successive ones of said remote chain relays, means including a movable contact on said pulse relay responsive to the first restoration of said pulse relay for simultaneously operating all said remote chain relays, means responsive to successive reoperations and restorations of said movable contact by said pulse relay responding to said code for sequentially restoring said remote chain relays always in the same order, a control circuit corresponding to each said remote chain relay, means for completing said control circuits one at a time in rapid succession in response to the sequential restoration of said remote chain relays, one of said successive restorations or reoperations of said pulse relay being delayed by the prolonged circuit interruption or circuit closure of said transmitted code to thereby delay the restoration of the corresponding remote chain relay for the time duration of said circuit interruption or circuit closure, a plurality of remote devices in said remote station, each remote device corresponding to a control device in said control station, each remote device successively connected by said circuit completing means to a corresponding one of said control circuits and normally inoperative in response to said rapid successive completions of their control circuits whereby only the remote device having its control circuit completed for the time duration of a prolonged circuit interruption or circuit closure is operated, said operated remote device thereby operating in correspondence with the said operated control device in said control station.

9. A remote control system as claimed in claim 8 wherein the extent and speed of operation of said operated control station device determines the amount of time said delayed control station chain relay is delayed in its restoring sequence, the restoring time period of said delayed control station chain relay determines the length of time of said prolonged circuit interruption or circuit closure of said transmitted code, the length of the time of said prolonged circuit interruption or circuit closure determines the length of time said delayed remote station chain relay is delayed in its restoring sequence, and the restoring time of said delayed remote station chain relay determines the extent of operation of said operated remote station device over its control circuit.

10. A remote control system as claimed in claim 8 wherein neutralizing circuit means is provided in both said control and remote stations to control one of said remote devices to be moved to its normal position in response to said corresponding control station control device being positioned in its normal position; said neutralizing circuit means in said control station including additional means for simultaneously operating all of said control station chain relays, said means for sequentially restoring said control station chain relays, and means for delaying the restoration of a particular one of said control station control relays to cause said transmitting means to transmit a code having a prolonged circuit closure designating a neutralizing control; said neutralizing circuit means in said remote station including said pulse relay and said remote chain relays operated in response to said transmitted code whereby said prolonged circuit closure designating said neutralizing control delays the restoration of the corresponding remote chain relay to complete its said control circuit for the time duration of said prolonged circuit closure to operate the corresponding remote device to its normal position.

11. In a remote control system having a plurality of controls at a control station and a plurality of corresponding remote controls at a remote station, means responsive to the operation of any one of said control station controls for transmitting a code comprising a predetermined number of successive circuit interruptions and circuit closures corresponding in number to the number of said controls in said control station, each of said circuit interruptions and each of said circuit closures corresponding to a different one of said control station controls and to corresponding different ones of said remote station controls, means dependent upon the particular one of said control station controls which is operated for prolonging the corresponding circuit interruption or circuit closure in said transmitted code, means in said remote station operated in response to said transmitted code for operating only the remote station control corresponding to the said prolonged circuit interruption or circuit closure of said transmitted code, control devices in said control station operated in response to and in accordance with the operation of said control station controls, and remote devices in said remote station corresponding to said control station devices operated to correspondence with said operated control station devices in response to the operation of said remote station controls.

12. A remote control system as claimed in claim 11 wherein said control station controls, said transmitting means and said prolonging means in said control station include a chain of stepping relays corresponding in number to the number of said control station controls, in which all of said control station relays are simultaneously operated in response to the operation of any one of said control station controls and sequentially restored in a predetermined sequence to transmit said code, and in which one of said control station relays corresponding to the operated one of said control station controls is delayed in its restoration to provide said prolonged circuit closure or circuit interruption of said transmitted code.

13. A remote control system as claimed in claim 11 wherein said means in said remote station operated in response to said transmitted code for operating only the remote station control corresponding to said prolonged circuit interruption or circuit closure includes a chain of stepping relays simultaneously operated in response to the first circuit interruption of said code, means for sequentially restoring said chain relays always in the same order in response to said successive circuit closures and circuit interruptions of said code, a control circuit for each said remote station control, means for completing said control circuits one at a time in rapid succession in response to the sequential restoration of said chain relays, means for delaying the restoration of one of said chain relays in response to said prolonged circuit interruption or said prolonged circuit closure of said transmitted code, and said control circuits being connected to said remote devices and normally ineffective to operate said remote devices in response to said rapid successive completions of their control circuits whereby only the remote device having its control circuit completed for the time duration of said prolonged circuit interruption or said prolonged circuit closure is operated.

14. A remote control system as claimed in claim 11 wherein in case more than one of said control station controls are simultaneously operated, said transmitting means and said prolonging means are operative to transmit a code having said predetermined number of successive circuit interruptions and circuit closures and in which said predetermined number includes as many prolonged circuit interruptions or prolonged circuit closures as there are simultaneously operated control station controls.

References Cited in the file of this patent
UNITED STATES PATENTS

| | | |
|---|---|---|
| 1,042,693 | Kramer | Oct. 29, 1912 |
| 2,070,590 | Goldsmith | Feb. 16, 1937 |
| 2,241,157 | Powell | May 6, 1941 |
| 2,393,892 | DeGanahl | Jan. 29, 1946 |
| 2,437,558 | Rockwood | Mar. 9, 1948 |
| 2,443,198 | Sallach | June 15, 1948 |
| 2,449,084 | Murray | Sept. 14, 1948 |
| 2,454,022 | Yardeny | Nov. 16, 1948 |
| 2,471,843 | Stamper | May 31, 1949 |
| 2,472,046 | Malcom | May 31, 1949 |
| 2,494,922 | Yardeny | Jan. 17, 1950 |
| 2,558,888 | Trimble | July 3, 1951 |
| 2,594,305 | Haller | Apr. 29, 1952 |
| 2,609,165 | Hill | Sept. 2, 1952 |
| 2,634,414 | Andrew | Apr. 7, 1953 |